E. U. PHILLIPS.
STOVEPIPE.
APPLICATION FILED JULY 28, 1908.
915,039.
Patented Mar. 9, 1909.
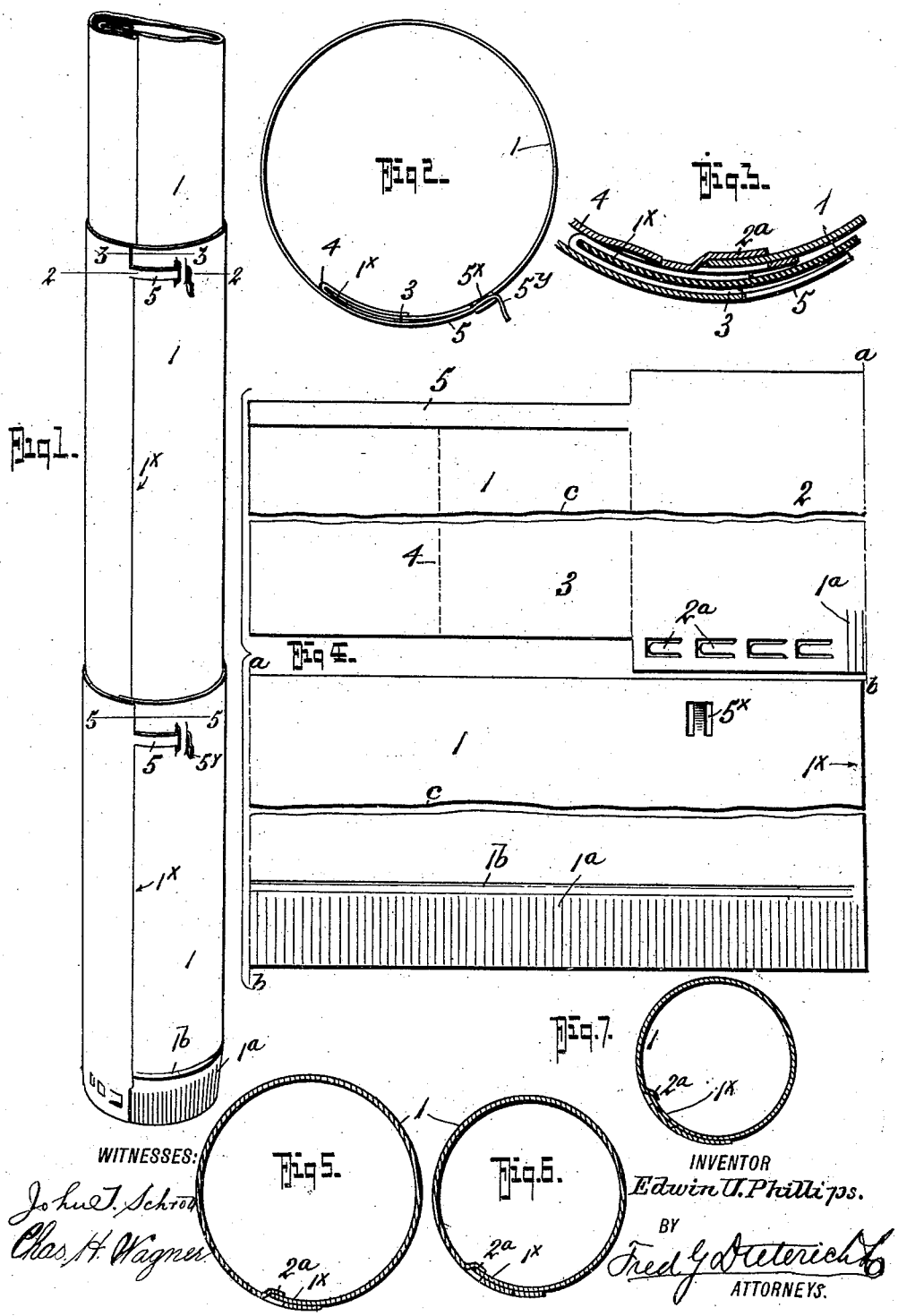
WITNESSES:
INVENTOR
Edwin U. Phillips.
BY
Fred G. Dieterich
ATTORNEYS.

UNITED STATES PATENT OFFICE.

EDWIN U. PHILLIPS, OF PORTLAND, OREGON, ASSIGNOR OF ONE-HALF TO FRANCIS J. McHENRY.

STOVEPIPE.

No. 915,039.  Specification of Letters Patent.  Patented March 9, 1909.

Application filed July 28, 1908. Serial No. 445,811.

*To all whom it may concern:*

Be it known that I, EDWIN U. PHILLIPS, residing at Portland, in the county of Multnomah, State of Oregon, have invented a Stovepipe, of which the following is a specification.

My invention relates to certain new and useful improvements in stove pipes and the like, and in its generic nature the invention embodies a stove pipe formed of a cylindrical member having provisions whereby its diameter may be increased or decreased to enable the pipe to be used with chimneys and stoves of different sizes and to enable tight connections to be made between the several joints of the pipe.

More specifically my invention embodies those novel details of construction, combination and arrangement of parts, all of which will be first described in detail and then be specifically pointed out in the appended claims, reference being had to the accompanying drawings, in which:—

Figure 1, is a perspective view of several sections of a stove pipe embodying my invention. Fig. 2, is a cross section on the line 2—2 of Fig. 1. Fig. 3, is a detail section on the line 3—3 of Fig. 1. Fig. 4, is a development of my improved pipe showing the same being bent into form, parts being broken away on the line $c$ and the two sections of the figure should be read with the lines $a$—$b$ together. Figs. 5, 6 and 7, are detail views on the line 5—5 of Fig. 1, illustrating the manner in which my improved pipe can be varied in diameter.

Referring now to the accompanying drawings, in which like numerals of reference indicate like parts in all of the figures, 1 designates my improved stove pipe which is constructed of sheet metal and is provided with the usual corrugated end $1^a$ having the beaded portion $1^b$ adjacent thereto.

2 designates an extension of the pipe sheet which is formed without the bead $1^b$ and with the corrugations $1^a$, and is provided with a series of stamped lugs $2^a$ spaced at intervals apart. The extension 2 merges with a further extension or projection 3 that is bent back upon itself as at 4, to provide a lap joint member to receive the free end $1^a$ of the pipe.

In assembling my improved pipe the free end $1^x$ of the sheet is inserted into the pocket formed by the lap members 3 and 4 and engages one of the lugs $2^a$ to hold it at its proper diameter at the corrugated end. The next pipe section has its corrugated end fitted into the uncorrugated end of the next adjacent pipe, which uncorrugated end is drawn tight around the corrugated end of the next pipe, by means of the strap 5 which passes through the slots $5^x$ of the pipe section and may be bent over as at $5^y$ to securely hold the pipe around the corrugated end of the next pipe section, as shown in Fig. 2 of the drawings. The projecting portions 3—4 of the pipe are made of less length than the full length of the pipe section so as to permit insertion of the corrugated end of the next pipe section in such manner that it may be readily clamped to the next adjacent pipe section.

From the foregoing it will be seen that by the use of my improved pipe, a pipe of variable diameter may be had and my improved construction of pipe need not only be formed of my improved sections, as shown in the drawings, but the pipe may be used in connection with the ordinary types of stove pipes since the corrugated end may be varied in diameter to fit into a smaller or larger pipe, as conditions may arise.

From the foregoing description taken in connection with the accompanying drawings, it is thought the complete construction, operation and advantages of my invention may be readily understood by those skilled in the art to which the invention appertains.

What I claim is:

1. A stove pipe section, comprising an elongated sheet metal member adapted to be bent into tubular form and having a straight edge and having a projection along one edge bent back upon itself to form a pocket to receive the opposite straight edge of the sheet metal member, said bent back projection being of less length than the pipe section, a series of lugs stamped near one end of said section beyond the bent back projecting edge to form stops against which said straight edge abuts said lugs lying in a plane at right angles to the axis of the stove pipe section when bent into tubular form, and means at the other end of the sheet metal section beyond the bent back projection to hold the section in its tubular form.

2. A stove pipe section, comprising an elongated sheet metal member adapted to be bent into tubular form and having a straight edge and having a projection along one edge bent back upon itself to form a pocket to receive the opposite straight edge of the sheet metal member, said bent back projection being of less length than the pipe section, a series of lugs stamped near one end of said section beyond the bent back projecting edge to form stops against which said straight edge abuts said lugs lying in a plane at right angles to the axis of the stove pipe section when bent into tubular form, means at the other end of the sheet metal section beyond the bent back projection to hold the section in its tubular form, said last named means comprising a tongue projecting from the edge of said sheet metal member adjacent to said bent back projection, said sheet metal member having slits through which said strap is adapted to pass to hold the section in its tubular form.

EDWIN U. PHILLIPS.

Witnesses:
A. T. LEWIS,
CHESTER A. SHEPPARD.